United States Patent [19]
Orii et al.

[11] Patent Number: 5,431,502
[45] Date of Patent: Jul. 11, 1995

[54] CARRIAGE MOTOR CONTROLLER FOR PRINTER

[75] Inventors: Yasunori Orii; Hirotomo Tanaka, both of Nagano, Japan

[73] Assignee: Seiko Epson Corporation, Tokyo, Japan

[21] Appl. No.: 76,749

[22] Filed: Jun. 15, 1993

[30] Foreign Application Priority Data

Aug. 17, 1992 [JP] Japan .................. 4-217947

[51] Int. Cl.$^6$ ........................................... B41J 19/30
[52] U.S. Cl. .............................. 400/279; 400/322; 400/903
[58] Field of Search ............... 400/279, 320, 322, 323, 400/124, 54, 74, 903

[56] References Cited

U.S. PATENT DOCUMENTS

| | | | |
|---|---|---|---|
| 4,761,085 | 8/1988 | Angst et al. | 400/322 |
| 4,777,609 | 10/1988 | Cavill et al. | 400/322 |
| 4,804,281 | 2/1989 | Yamakawa | 400/54 |
| 4,819,556 | 4/1989 | Abe et al. | 400/322 |
| 5,007,751 | 4/1991 | Yamakawa | 400/322 |
| 5,064,302 | 11/1991 | Tanuma | 400/54 |
| 5,116,150 | 5/1992 | Courtney | 400/322 |
| 5,186,550 | 2/1993 | Koike | 400/54 |
| 5,306,084 | 4/1994 | Orii | 400/279 |
| 5,310,272 | 5/1994 | Nishizawa | 400/279 |

FOREIGN PATENT DOCUMENTS

204277 12/1986 European Pat. Off. ............ 400/279
491445A2 6/1992 Germany ........................... 400/279

Primary Examiner—David A. Wiecking
Assistant Examiner—Steven S. Kelley
Attorney, Agent, or Firm—Sughrue, Mion, Zinn, Macpeak & Seas

[57] ABSTRACT

A carriage motor controller for a printer. The controller includes a drive mechanism for driving a carriage motor to thereby cause a carriage to travel; a detector for detecting a position and a speed of the carriage while the carriage is travelling; a measuring device for measuring characteristics of the carriage motor on the basis of the detected position and speed; storage for storing the measured characteristics; a first controller for controlling the drive mechanism and causing the carriage to travel for the purposed of taking the necessary measurements, the measurements being taken after a power switch has been turned on, after a sheet has been fed, or after a predetermined time has elapsed; and a second controller for controlling the drive mechanism upon reception of a print command on the basis of the print command and the stored characteristics to thereby cause the carriage to travel for printing. In such a controller, the measurements are made not only while the carriage is travelling for the sole purpose of taking the measurements, but also while the carriage is travelling for printing. Additionally, the stored characteristics are periodically updated in accordance with newly measured characteristics.

16 Claims, 4 Drawing Sheets

CARRIAGE MOTOR CONTROLLER FOR PRINTER

BACKGROUND OF THE INVENTION

The invention relates to carriage motor control for printers. More particularly, it is directed to a controller which appropriately determines a deceleration start position of the carriage motor in accordance with characteristics of the carriage motor so that the carriage stops at a predetermined position.

Many printers are designed to print during acceleration and deceleration of the carriage motor to improve their throughput. To eliminate wasteful travel of the carriage, as well as to improve throughput and downsize the printer, it is necessary to accurately measure acceleration and deceleration distances of the carriage. Particularly, the distance required for deceleration is an important factor in determining the minimum distance that is necessary and sufficient for the carriage to travel after the carriage has started decelerating at an optimal position.

A step motor or a dc motor is usually used as the carriage motor. The deceleration distance is constant for the step motor, whereas it varies for the dc motor since dc motor characteristics change due to changes in temperature and load. Therefore, printers using a dc motor as a carriage motor start decelerating the carriage motor at a safe position that is sufficiently close to the print end position, taking into account such deceleration distance variations. In other words, the deceleration start position is determined on the basis of a sufficiently short distance that has been determined as a deceleration distance in advance.

However, the conventional method of determining the deceleration start position is not satisfactory from the viewpoint of throughput improvement and downsizing. The reason is that if the motor winding resistance is increased due to an increase in motor temperature, the current flowing into the motor decreases, which then reduces the braking torque. This makes the actual deceleration distance longer than the estimated deceleration distance, thus causing the carriage to travel a longer distance upon completion of printing.

Similar problems that are attributable to motor characteristic variations will be addressed not only in regard to deceleration control but also in regard to various other aspects of carriage motor control.

SUMMARY OF THE INVENTION

Therefore, a general object of the invention is to allow carriage motor characteristic variations to be considered in controlling the carriage motor by periodically detecting the carriage motor characteristics.

A specific object of the invention is to allow the carriage motor to start decelerating at an optimal position which is determined by periodically detecting the carriage motor decelerating characteristics.

To achieve the above object, the invention is applied to a carriage motor controller for a printer, which includes: drive means for driving a carriage motor to thereby cause a carriage to travel; detecting means for detecting a position and a speed of the carriage while the carriage is travelling; measuring means for measuring characteristics of the carriage motor on the basis of the detected position and speed; storage means for storing the measured characteristics; first control means for controlling the drive means and causing the carriage to travel to allow the necessary measurement of the characteristics, the control being performed after a power switch has been turned on, after a sheet has been fed, or after a predetermined time period; and second means for controlling the drive means upon reception of a print command on the basis of the print command and the stored characteristics to thereby cause the carriage to travel for printing. In such a controller, the measurement by the measuring means is made not only while the carriage is travelling, but also while the carriage is travelling for printing; and the characteristics stored in the storage means are updated in accordance with newly measured characteristics from time to time.

As noted above, according to the invention, the characteristics of the carriage motor are periodically measured. One of the measured characteristics is the deceleration distance of the carriage motor. This measurement is used to determine a carriage motor deceleration start position at the time that the measurement is taken. These measurements are taken by moving the carriage at the time when the power switch is turned on, when a sheet is fed and when a waiting time is longer than a predetermined time. After the motor characteristics are measured at the above times, the characteristics are stored. The measured motor characteristics are used for a first carriage travel control after the printing. Additionally, motor characteristic measurements are also made during printing, and the stored measurement data are updated every time a new measurement is made. As a result, the most recent data is in storage so that carriage travel control for printing is performed on the basis of the most recently measured motor characteristics.

DETAILED DESCRIPTION OF THE PREFERRED EMBODIMENTS

Figure 1:
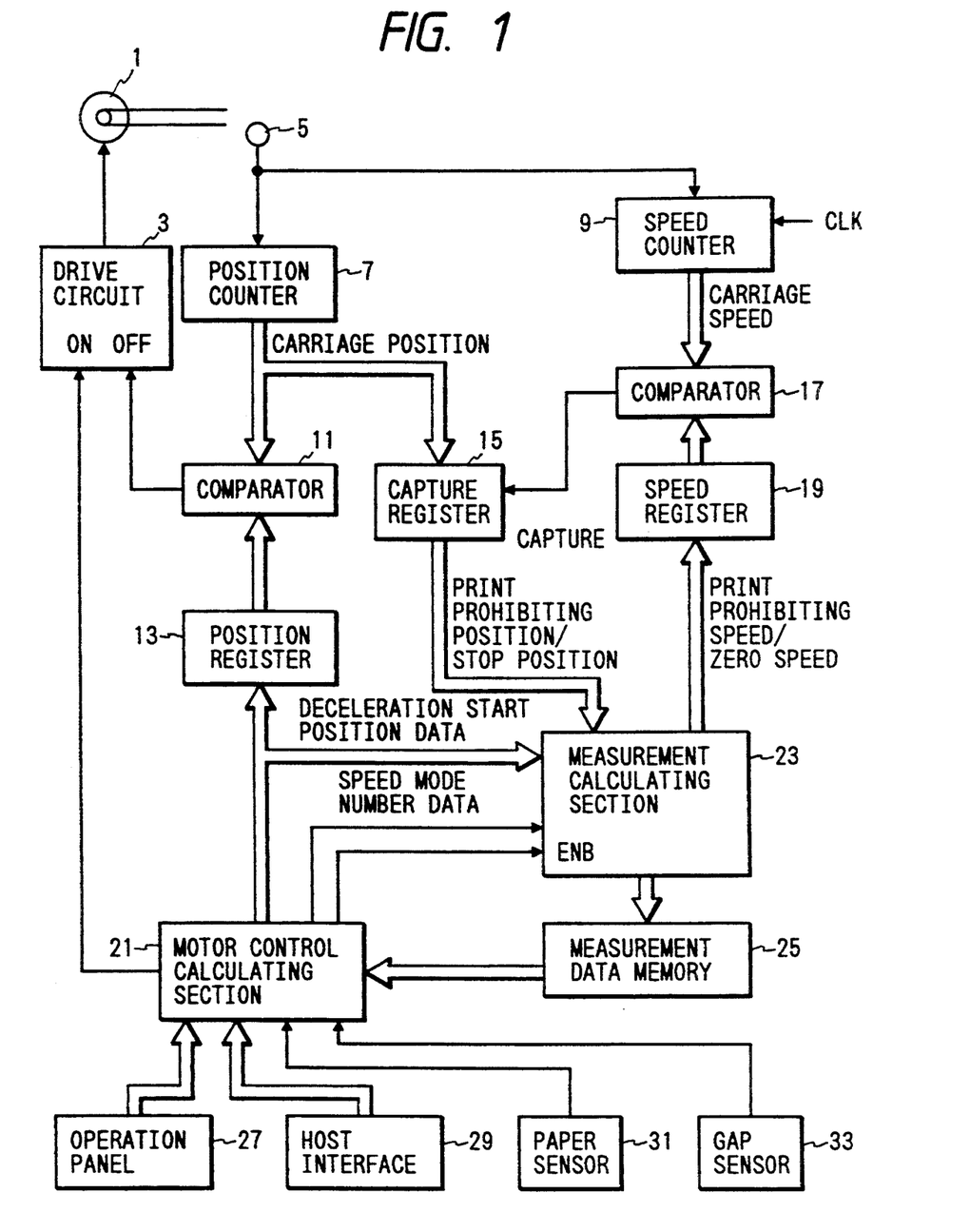
FIG. 1 is a block diagram showing an embodiment of the invention.

FIG. 1 is a block diagram showing a carriage motor controller according to a first embodiment of the invention.

In FIG. 1, a carriage motor 1 is a dc motor which is driven by a drive circuit 3. The drive circuit 3 starts the carriage motor 1 upon receiving an ON signal from a motor control calculating section 21 and accelerates the motor 1 to a predetermined reference speed. The drive circuit 3 keeps the carriage motor 1 running at this reference speed and stops the carriage motor 1 thereafter upon receiving an OFF signal from a comparator 11. In the course of acceleration, constant-speed running, and deceleration, printing is effected once the carriage motor 1 has been accelerated to a predetermined print prohibiting speed (the speed which is lower than the above reference speed and below which printing is prohibited) and continues until the carriage motor is subsequently decelerated below the print prohibiting speed.

An encoder 5 detects the rotational displacement of the carriage motor 1 and generates a pulse signal every predetermined unit of rotational displacement. This pulse signal is applied to a position counter 7, which, in turn, generates position data indicating an absolute position of the carriage by counting the pulse signals. The pulse signal from the encoder 5 is applied also to a speed counter 9. The speed counter 9 counts high-frequency clock pulses CLK in a single cycle of the pulse signal to thereby generate speed data indicating the rotational speed of the carriage motor 1.

The position data generated by the position counter 7 is fed to the comparator 11 so that the position data can be compared with data indicating the carriage deceleration start position that is stored in a position register 13 in advance. When the absolute position of the travelling carriage has reached the deceleration start position, the comparator 11 applies an OFF signal to the drive circuit 3, which causes the carriage motor 1 to start decelerating.

The position data generated by the position counter 7 is further applied to a capture register 15. Upon reception of a capture signal from a comparator 17, the capture register 15 reads and stores the position data from the position counter 7. The comparator 17 for generating the capture signal compares the speed data generated by the speed counter 9 with speed data that is stored in a speed register 19 in advance, and generates the capture signal when both data coincides. The speed register 19 sequentially stores two kinds of speed data from a measurement calculating section 23 as will be described later. The print prohibiting speed data (hereinafter referred to as "print prohibiting speed data") is stored first. If this print prohibiting speed data matches the speed data from the speed counter 9, then data indicating that the speed is zero (hereinafter referred to as "zero data") is stored. This operation is performed to detect, during deceleration, both the timing at which the speed has reached the print prohibiting speed and the timing at which the carriage motor 1 has been stopped in the course of decelerating the carriage motor 1. It is at these two points that the capture signals are applied to the capture register 15 and that the position data of the carriage motor 1 at the respective timings are stored in the capture register 15. The position data stored in the capture register 15 are read by the measurement calculating section 23. Therefore, the measurement calculating section 23 reads both the carriage position data when the carriage motor 1 has been decelerated to the print prohibiting speed and the carriage position data when the carriage motor 1 has been stopped (hereinafter referred to as "stop position data").

As described before, the motor control calculating section 21 generates an ON signal for activating the carriage motor 1. This ON signal is generated at the time when printing is begun for each line while printing of a document is being effected. In a period in which no printing is effected, the motor control calculating section 21 causes the carriage to travel by generating the ON signal in particular cases in order to measure the carriage motor characteristics (hereinafter referred to as "measurement operation"), which will be described later. Carriage travel for printing is referred to as "print travel" and carriage travel for measurement operations only is referred to as "measurement travel". The motor control calculating section 21 also calculates a deceleration start position of the carriage motor 1 in each print travel and each measurement travel. The calculated deceleration start position data are stored in the position register 13 during the carriage travel and are inputted to the measurement calculating section 23. The motor control calculating section 21 also performs the functions of applying speed mode number data indicating a speed mode and applying enabling signals (ENB) for operating the measurement calculating section 23.

The measurement calculating section 23 performs measurement operations, i.e., calculation of the characteristics of the carriage motor 1. One characteristic of the motor to be calculated is the carriage motor 1 deceleration distance, i.e., a travel distance of the carriage (indicated by the number of output pulses of the encoder 5) from the deceleration start to the print prohibiting speed. This deceleration distance is calculated from the deceleration start position data from the motor control calculating section 21 as well as the print prohibiting position data and the stop position data from the capture register 15.

In addition, an acceleration distance of the carriage motor 1 (the travel distance between activation and the timing at which the motor has reached the reference speed) and an acceleration time (the time required for travel between activation and print start, e.g., a time equal to 80 output pulses of the encoder 5), and the like are calculated. These motor characteristics are calculated individually for each of a plurality of speed modes and of forward travel and backward travel of the carriage. The calculated data (measurement data) are stored in a measurement data memory 25. Every time a new measurement operation is performed, the corresponding data in the measurement data memory 25 is updated. The measurement data in the measurement data memory 25 is periodically read out from the motor control calculating section 21 to be used for carriage motor control effected by the motor control calculating section 21. For example, the deceleration distance data is used for the calculation of deceleration start position data. Further, the acceleration distance data is used to move the carriage to a desired position. The acceleration time is used, e.g., to determine the carriage motor 1 activating timing.

An operation panel 27 is connected to the motor control calculating section 21. The operation panel 27 includes various switches, such as a power switch and a speed mode selector switch. When the power switch on the operation panel 27 has been turned on, a reset signal is applied to the motor control calculating section 21. The motor control calculating section 21, upon receiving the reset signal, clears the data in the measurement data memory 25. When the speed mode selector switch on the operation panel 27 has been operated, a number indicating the speed mode selected by the operation is supplied to the motor control calculating section 21. The term "speed mode" corresponds to a speed at which the carriage travels during printing (i.e., reference speed mode). A plurality of speed modes are available in this embodiment. Speed mode selection is done not only by the speed mode selector switch, but also by a print command from a host computer (described later) and automatically by the printer as well. When a speed mode has been selected, the motor control calculating section 21 feeds the speed mode number data to the measurement calculating section 23.

The motor control calculating section 21 also receives reset signals and print commands sent from a host computer (not shown) through a host interface 29. Upon reception of a reset signal from the host computer, the motor control calculating section 21 clears measurement data in the measurement data memory 25 in a manner similar to the case in which a reset signal has been received from the operation panel 27. Upon reception of a print command from the host computer, the motor control calculating section 21 checks that the measurement data of the speed mode selected for such printing is present in the measurement data memory 25. If not, the motor control calculating section 21 effects a special control procedure for measurement operation. In this special control procedure, the characteristics are calculated by performing the following steps: (1) starting a measurement travel upon application of an ON signal to the drive circuit 3; (2) inputting predetermined deceleration start position data of the measurement travel to the position register 13 and the measurement calculating section 23; and (3) inputting an ENB signal to the measurement calculating section 23. In this case, the measurement operation is performed for both forward and backward travels. After the measurement operation, the motor control calculating section 21 starts print control in accordance with the print command. In the print control, the following operations are performed for each line of a document to be printed. Print travels (both forward and backward travels) are started upon application of an ON signal to the drive circuit 3 at a timing determined by a known method, and the deceleration start position data for such print travels are calculated and applied to the position register 13 and the measurement calculating section 23. In this case, the deceleration start position data are calculated using data indicating the print end position of each line included in the print command as well as deceleration distance data stored in the measurement data memory 25. Even during the print travel for each line, the motor control calculating section 21 applies an ENB signal to the measurement calculating section 23 to start measurement operations. As a result, the measurement data in the measurement data memory 25 are updated each time a line is printed.

The motor control calculating section 21 is also connected to a paper sensor 31 and a gap sensor 33. The paper sensor 31 detects feeding of a sheet of paper (not shown) into the printer and supplies the sheet feed signal to the motor control calculating section 21. In this embodiment, a paper roll in which the pages run consecutively is used as the printing paper. The motor control calculating section 21 clears the measurement data in the measurement data memory 25 upon recognition from the form feed signal that a new form has been fed. The gap sensor 19 detects a gap between a platen and a print head (both not shown) and applies the gap signal to the motor control calculating section 21. In this embodiment, a wire dot type head is used as the print head. The motor control calculating section 21 clears the measurement data in the measurement data memory 25 upon recognition from the gap signal that the gap has been changed.

Figure 2:
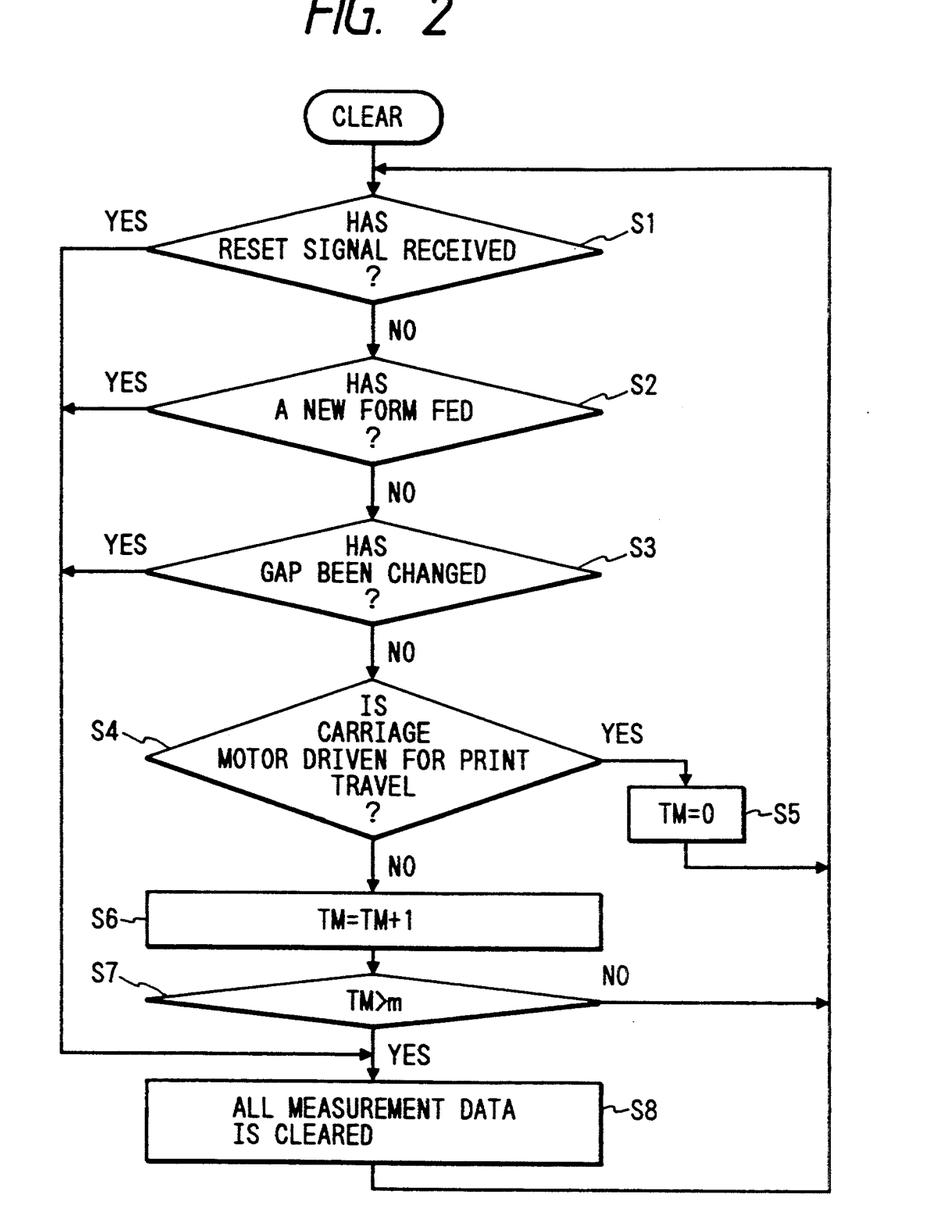
FIG. 2 is a flowchart showing the processing of clearing measurement data according to the embodiment shown in FIG. 1.

FIG. 2 is a flowchart showing a procedure to be followed by the motor control calculating section 21 to clear measurement data.

Referring to FIG. 2, the motor control calculating section 21 checks that a reset signal has been received from the operation panel 27 or from the host computer (Step S1). If not, the motor control calculating section 21 checks that a new form has been fed (Step S2). If it has not, the motor control calculating section 21 checks that the gap has been changed (Step S3). If the answers to any of these three questions are affirmative, then the motor control calculating section 21 clears all the measurement data in the measurement data memory 25 (Step S8). If the answers to each of these questions are negative, the motor control calculating section 21 checks that the carriage motor is driven for print travel (Step S4). If the carriage motor has been driven, a timer counter TM for measuring a print waiting time is cleared (Step S5). If, on the other hand, the carriage motor has not been driven, the motor control calculating section 21 increments the timer counter TM (Step S6) and clears all the measurement data in the measurement data memory 25 (Step S8) when the value in the timer counter TM has exceeded a predetermined value n (Step S7).

By repeating the above procedure cyclically, all the measurement data is cleared when the power switch has been turned on, when a reset signal has been inputted from the host computer, when a new form has been fed, when the gap between the platen and the head has been changed and when the waiting time has exceeded a predetermined time.

Figure 3:
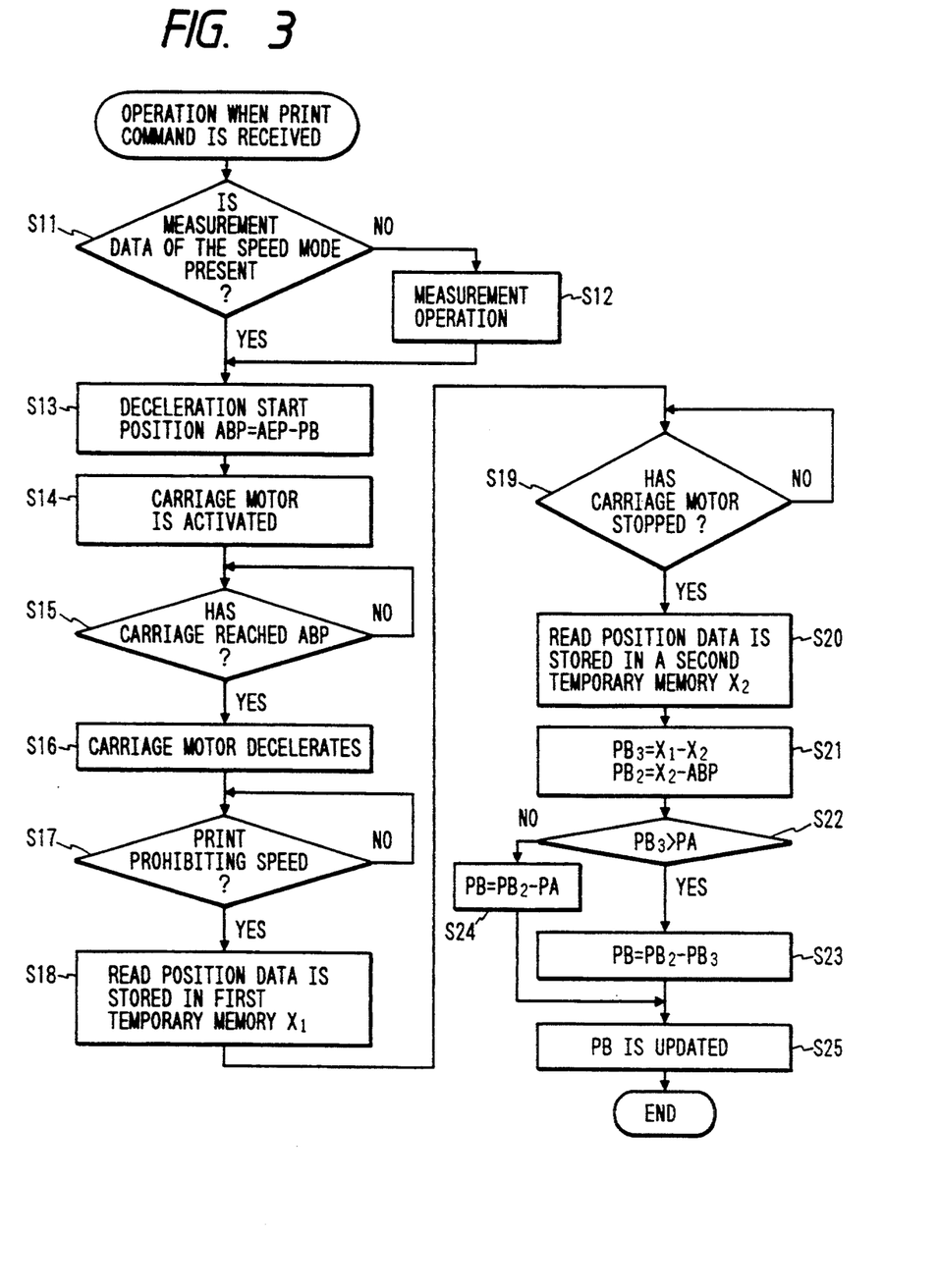
FIG. 3 is a flowchart showing the processing of calculating measurement data according to the embodiment shown in FIG. 1.
Figure 4:
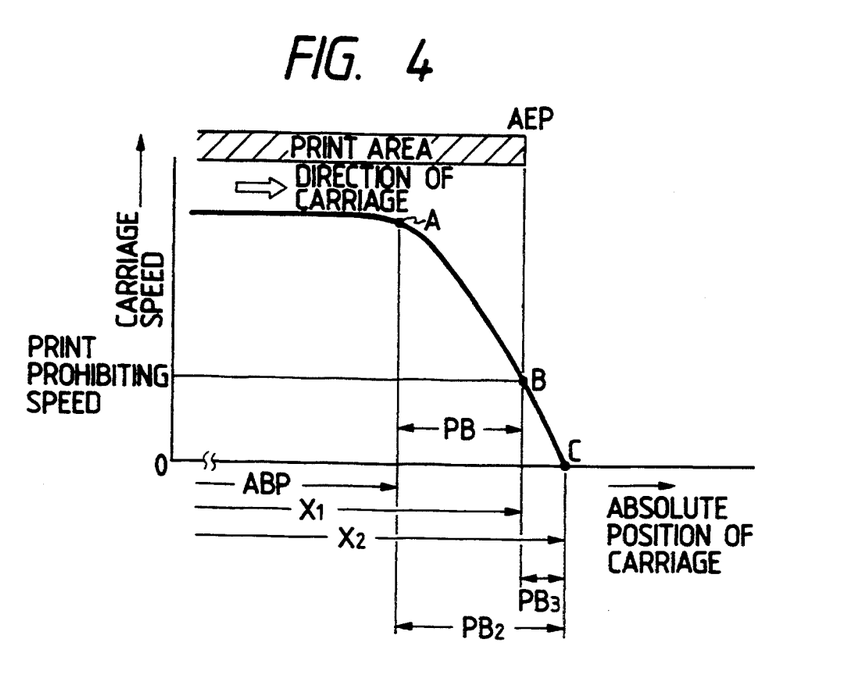
FIG. 4 is a diagram showing a state in which the carriage moves in the forward direction, the diagram describing the method of calculating a deceleration distance in the processing shown in FIG. 3.
Figure 5:
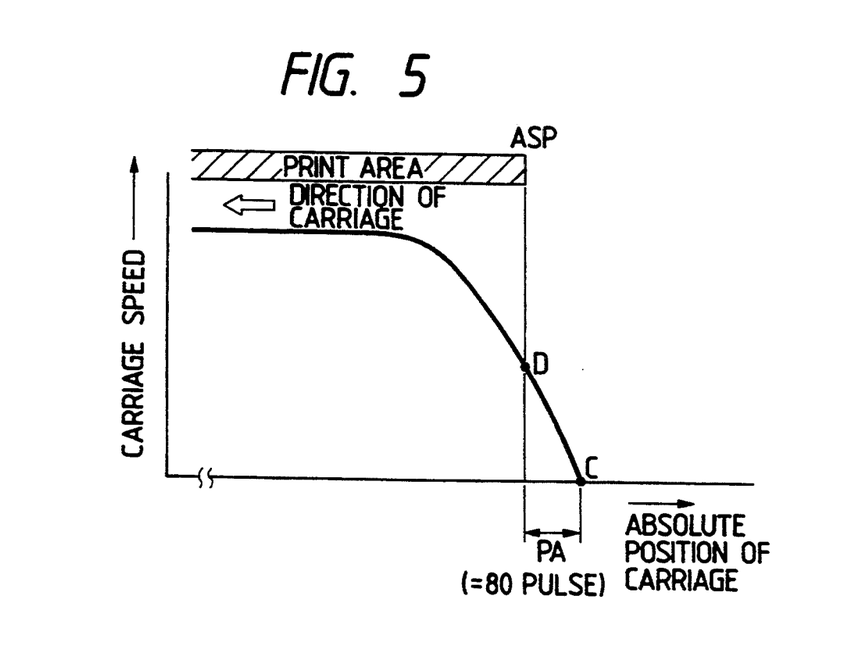
FIG. 5 is a diagram showing a state in which the carriage moves in the return direction, the diagram describing the method of calculating the deceleration distance in the processing shown in FIG. 3.

FIG. 3 is a flowchart showing a procedure to be followed to obtain measurement data. The procedure is performed when the motor control calculating section 21 has received a print command from the host computer. FIGS. 4 and 5 are diagrams illustrative of the method of calculating the deceleration distance, which is one piece of measurement data.

Referring to FIG. 3, upon reception of a print command from the host computer, the motor control calculating section 21 checks that measurement data of the speed mode selected for such printing is present in the measurement data memory 25 (Step S11) If the power switch has been turned on, a reset signal applied, a new form fed, the gap between the head and the platen changed or the printer stopped for a long time before the print command has been received, then all the measurement data is cleared as described with reference to FIG. 2. Thus, the answer is negative in Step S11. In this case, the motor control calculating section 21 effects the above-described special control to perform the measurement operation (Step S12). That is, the motor control calculating section 21 applies an ON signal to the drive circuit 3 and applies predetermined start position data for measurement travel to the position register 13 and the measurement calculating section 23. Then, the motor control calculating section 21 supplies an ENB signal to the measurement calculating section 23. This causes the drive circuit 3 to drive the carriage for measurement travel in the selected speed mode. The measurement calculating section 23 calculates the acceleration time, the acceleration distance, and the deceleration distance during this measurement travel. The deceleration distance is calculated following a procedure similar to Steps S17 to S24, which will be described below. The measurement operation is effected on both forward and backward travel by the carriage. The calculated measurement data are stored in an area corresponding to the selected speed mode in the measurement data memory 25.

When the measurement operation in Step S12 has been completed, or when the measurement data on the speed mode has already been stored in the measurement data memory 25 in Step S11, the motor control calculating section 21 starts control for printing each line of a document in accordance with the print command. That is, the motor control calculating section 21 reads a deceleration distance PB for the speed mode from the measurement data memory 25, and a deceleration start position ABP (=AEP−PB) is calculated by subtracting the deceleration distance PB from a print end position AEP included in the print command (Step S16). This calculation enables the determination of the deceleration start position ABP so that the carriage can exactly reach the print end position AEP when the speed of the carriage motor has been decelerated to the print prohibiting speed (point B) as shown in FIG. 4. The determined deceleration start position data ABP is not only stored in the position register 13, but also applied to the measurement calculating section 23.

Then, the motor control calculating section 21 inputs an ON signal to the drive circuit 3 to cause the drive circuit 3 to activate the carriage motor 1 (Step S14). The drive circuit 3 accelerates the carriage motor 1 and causes the carriage motor 1 to travel at a constant speed when the reference speed in the selected mode has been reached. During the constant speed travel, the comparator 11 checks that the carriage has reached the deceleration start position ABP (Step S15). If the deceleration start position ABP has been reached, an OFF signal is supplied to the drive circuit 3, which then decelerates the carriage motor 1 (Step S16).

Upon start of deceleration, the measurement calculating section 23 writes the print prohibiting speed data to the speed register 19. The comparator 17, in turn, checks that the carriage motor 1 speed has been reduced to the print prohibiting speed (Step S17). If the print prohibiting speed has been reached, the current position of the carriage (print prohibiting position) is read by the capture register 15. The read position data is then sent to the measurement calculating section 23 and stored in a first temporary memory X1 (Step S18).

The measurement calculating section 23 writes the zero data to the speed register 19. The comparator 17 then checks that the carriage motor 1 has been stopped (Step S19). If the carriage motor 1 has been stopped, the current position of the carriage (stop position) is read by the capture register 15, and sent to the measurement calculating section 23 and stored in a second temporary memory X2 (Step S20).

Then, the measurement calculating section 23 calculates a difference between the print prohibiting position and the stop position respectively stored in the first and second temporary memories X1, X2, and sets the calculated difference as a print prohibiting distance PB3 (Step S21). The print prohibiting distance PB3 corresponds to the travel distance in which no printing can be effected (i.e., the distance between point B at which the carriage speed has reached the print prohibiting speed and point C at which the carriage has been stopped as shown in FIG. 4). Then, the measurement calculating section 23 calculates a difference between the stop position and the deceleration start position ABP in the second temporary memory X2, and sets the calculated difference as a stop distance PB2 (Step S21). The stop distance PB2 means a travel distance between point A at which deceleration has been started and point C at which the carriage has been stopped as shown in FIG. 4.

The measurement calculating section 23 then compares the print prohibiting distance PB3 calculated in the last step with a predetermined idle travel distance PA during acceleration (Step S22). If PB3>PA, then a difference between the stop distance PB2 and the print prohibiting distance PB3 (PB2−PB3) is set as the deceleration distance PB (Step S23). If PB3<PA, a difference between the stop distance PB2 and the idle travel distance PA (PB2−PA) is set as the deceleration distance PB (Step S24). The idle travel distance PA means a distance determined in advance to ensure stable control of the carriage motor 1 and a distance to be travelled by the carriage between carriage motor start and print start. This distance is equal to, e.g., 80 pulses of the encoder.

The importance of the steps S22 to S24 is as follows. The carriage travels forwardly and stops at point C as shown in FIG. 4, and then travels backwardly from point C as shown in FIG. 5 while printing. A print start position ASP in the backward travel must be positioned to the left of point C by at least the idle travel distance PA, i.e., the carriage stop position in the backward travel. In other words, at least a distance equivalent to the idle travel distance PA must be provided between the stop position C in the forward travel and the print start position ASP in the backward travel. Such distance can be provided as long as the print prohibiting distance PB3 is longer than the idle travel distance PA. If the print prohibiting distance PB3 is shorter than the idle travel distance PA, the stop position C must be shifted rightward by the shortened distance. In other words, the deceleration start position A must be shifted rightwardly by the shortened distance. Then, the deceleration distance PB may be determined as PB2−PA as in Step S21. While a case in which the carriage movement switches from the forward travel to the backward travel has been described above, the same can apply to a case in which the carriage movement switches from the backward travel to the forward travel.

As a deceleration distance PB is measured in this way every time the carriage is traversed to print a line, deceleration distance data at the corresponding area in the measurement data memory 25 is updated (Step S25). The updated deceleration distance data is used to determine the deceleration start position for a next print travel in the same direction (the forward or the backward travel).

As described above, according to the invention, the carriage motor characteristics are periodically measured when the power switch is turned on, when a reset signal from the host computer has been inputted, when feeding a new form, when changing the gap between the head and the platen, and when the lapse of the waiting time is longer than a predetermined time. Using the measured motor characteristics, the driving of the carriage motor can be properly controlled. In addition, the measurement data are updated every time the carriage makes a print travel for each line, and the updated measurement data are utilized to effect the next drive control of the carriage motor. As a result, even though the characteristics of the carriage motor have been changed, control accommodating such characteristic change can be made, hence allowing wasteful motor drive to be dispensed with.

As described in the foregoing pages, the invention attempts to control the carriage motor on the basis of the latest measurement data while periodically measuring the carriage motor characteristics. Therefore, any motor characteristic change can be accommodated by appropriate control.

What is claimed is:

1. A carriage motor controller for a printer, comprising:

drive means for driving a carriage motor to thereby cause a carriage to travel;

detecting means for detecting a position and a speed of the carriage while the carriage is travelling;

measuring means for measuring operational characteristics of the carriage motor on the basis of the detected position and speed;

storage means for storing the measured characteristics;

first control means for controlling the drive means so as to cause said carriage to travel without printing to initially obtain the measured characteristics, said first control means controlling said drive means selectively in response to a power switch being turned on, a sheet being fed, or a predetermined time having elapsed; and second control means for controlling the drive means upon reception of a print command on the basis of the print command and the stored characteristics to thereby cause the carriage to travel for printing, wherein the measurement by the measuring means is performed when the carriage travels in printing a line and wherein the characteristics stored in the storage means are periodically updated with newly measured characteristics.

2. The carriage motor controller of claim 1, wherein the measurement means measures the characteristics during both forward and backward travels, and wherein the second control means controls the forward travel for printing on the basis of the stored characteristics during the forward travel and controls the backward travel for printing on the basis of the stored characteristics during the backward travel.

3. The carriage motor controller of claim 1, wherein the measurement means measures a deceleration distance as one of the characteristics.

4. The carriage motor controller of claim 3, wherein the second control means controls a deceleration start position for the print travel on the basis of the deceleration distance stored in the storage means and a print end position contained in the print command, the control of the deceleration start position being effected so that a sum of the deceleration start position and the stored deceleration distance coincides with the print end position.

5. The carriage motor controller of claim 4, wherein the measurement means adjusts the deceleration distance in accordance with an idle travel distance determined in advance for acceleration of the carriage motor at the time the deceleration distance is measured.

6. A carriage motor controller for a printer, comprising:

drive means for driving a carriage motor to thereby cause a carriage to travel;

detecting means for detecting a position and a speed of the carriage while the carriage is travelling;

measuring means for measuring characteristics of the carriage motor including a deceleration distance thereof on the basis of the detected position and speed;

storage means for storing the measured characteristics;

first control means for controlling the drive means and causing the carriage to travel without printing to initially obtain the measured characteristics; and second control means for controlling the drive means upon reception of a print command on the basis of the print command and the stored characteristics to thereby cause the carriage to travel for printing, said second control means controlling a deceleration start position for the print travel on the basis of the deceleration distance stored in the storage means and a print end position contained in the print command at which printing is terminated.

7. The carriage motor of claim 6, wherein the control of the deceleration start position is effected so that a sum of the deceleration start position and the stored deceleration distance coincides with the print end position.

8. The carriage motor of claim 7, wherein said detecting means included means for detecting a carriage stop distance corresponding to the distance traveled by said carriage beyond said deceleration start position.

9. The carriage motor of claim 8, wherein said measurement means includes means for measuring a print prohibiting distance representing the difference between said carriage stop distance and said deceleration distance.

10. The carriage motor of claim 9, further comprising means for comparing said print prohibiting distance with an idle travel distance corresponding to a distance traveled by said carriage from a stop position to a position at which printing begins.

11. The carriage motor controller of claim 10, wherein said deceleration distance is adjusted when it is determined that said idle travel distance is greater than said print prohibiting distance.

12. The carriage motor controller of claim 11, wherein when said idle travel distance is greater than said print prohibiting distance, said deceleration is set as the difference between the carriage stop distance and the idle travel distance, and when said idle travel distance is less than said print prohibiting distance, said deceleration distance is set as the difference between the carriage stop distance and the print prohibiting distance.

13. A carriage motor controller for a printer, comprising:

a driver for driving a carriage motor to thereby cause a carriage to travel;

a detector for detecting a position and a speed of the carriage while the carriage is travelling;

a measuring device for measuring operational characteristics of the carriage motor on the basis of the detected position and speed;

a memory device for storing the measured characteristics;

a first control device for controlling the driver so as to cause said carriage to without printing to initially obtain the measured characteristics, said first control device controlling said driver selectively in response to a power switch being turned on, a sheet being fed, or a predetermined time having elapsed; and a second control device for controlling the driver upon reception of a print command on the basis of the print command and the stored characteristics to thereby cause said carriage to travel for printing, wherein the measurement by the measuring device is performed when the carriage travels in printing a line and wherein the characteristics stored in the memory device are periodically updated with newly measured characteristics.

14. A carriage motor controller for a printer, comprising:
   a driver for driving a carriage motor to thereby cause a carriage to travel;
   a detector for detecting a position and a speed of the carriage while the carriage is travelling;
   a measuring device for measuring characteristics of the carriage motor including a deceleration distance thereof on the basis of the detected position and speed;
   a memory device for storing the measured characteristics;
   a first control device for controlling the drive means and causing the carriage to without printing to initially obtain the measured characteristics; and
   a second control device for controlling the driver upon reception of a print command on the basis of the print command and the stored characteristics to thereby cause the carriage to travel for printing, said second control device controlling a deceleration start position for the print travel on the basis of the deceleration distance stored in said memory device and a print end position contained in the print command at which printing is terminated.

15. A method of controlling a carriage motor controller for a printer, comprising the steps of:
   driving a carriage motor to thereby cause a carriage to travel;
   detecting a position and a speed of the carriage while the carriage is travelling;
   measuring operational characteristics of the carriage motor on the basis of the detected position and speed;
   storing the measured characteristics in a storage device, wherein said driving step comprises:
   initially driving the carriage motor without printing so as to cause said carriage to travel to initially obtain the measured characteristics selectively in response to a power switch being turned on, a sheet being fed, or a predetermined time having elapsed; and
   print driving the carriage motor upon reception of a print command on the basis of the print command and the stored characteristics to thereby cause the carriage to travel for printing, wherein said measuring is performed when the carriage travels in printing a line and wherein the characteristics stored in the storage device are periodically updated with newly measured characteristics.

16. A method of controlling a carriage motor controller for a printer, comprising the steps of:
   driving a carriage motor to thereby cause a carriage to travel;
   detecting a position and a speed of the carriage while the carriage is travelling;
   measuring characteristics of the carriage motor including a deceleration distance thereof on the basis of the detected position and speed;
   storing the measured characteristics in a storage device, wherein said driving step comprises:
   initially driving the carriage motor without printing, causing the carriage to travel to initially obtain the measured characteristics; and
   print driving the carriage motor upon reception of a print command on the basis of the print command and the stored characteristics to thereby cause the carriage to travel for printing, and controlling a deceleration start position for the print travel on the basis of the deceleration distance stored in said storage device and a print end position contained in the print command at which printing is terminated.

* * * * *